(12) United States Patent
Yang et al.

(10) Patent No.: US 12,050,105 B2
(45) Date of Patent: Jul. 30, 2024

(54) MEMS GYROSCOPE

(71) Applicant: AAC Kaitai Technologies (Wuhan) CO., LTD, Hubei (CN)

(72) Inventors: Shan Yang, Shenzhen (CN); Zhan Zhan, Shenzhen (CN); Shitao Yan, Shenzhen (CN); Zhao Ma, Shenzhen (CN); Xiao Kan, Shenzhen (CN); Hongtao Peng, Shenzhen (CN); Yan Hong, Shenzhen (CN); Kahkeen Lai, Singapore (SG); Veronica Tan, Singapore (SG)

(73) Assignee: AAC KAITAI TECHNOLOGIES (WUHAN) CO., LTD, Wuhan (CN)

( * ) Notice: Subject to any disclaimer, the term of this patent is extended or adjusted under 35 U.S.C. 154(b) by 247 days.

(21) Appl. No.: 17/873,193

(22) Filed: Jul. 26, 2022

(65) Prior Publication Data

US 2023/0213339 A1 Jul. 6, 2023

(30) Foreign Application Priority Data

Dec. 31, 2021 (CN) .......................... 202111675123.1

(51) Int. Cl.
*G01C 19/5733* (2012.01)
(52) U.S. Cl.
CPC ................ *G01C 19/5733* (2013.01)

(58) Field of Classification Search
None
See application file for complete search history.

(56) References Cited

U.S. PATENT DOCUMENTS

| 9,218,065 | B2* | 12/2015 | Mahameed | ........... G06F 3/0346 |
| 10,495,663 | B2* | 12/2019 | Najafi | .................. G01P 15/125 |
| 10,742,191 | B2* | 8/2020 | Elsayed | ................ B81B 3/0086 |
| 2018/0342667 | A1* | 11/2018 | Kuisma | .............. G01C 19/5747 |

* cited by examiner

*Primary Examiner* — Brandi N Hopkins
*Assistant Examiner* — Nigel H Plumb
(74) *Attorney, Agent, or Firm* — W&G Law Group

(57) ABSTRACT

A MEMS gyroscope includes an anchor point, a resonator, and a transducer. The resonator includes eight resonating blocks arranged at equal intervals and a coupling beam connecting each two adjacent resonating blocks. The resonating blocks are connected with the anchor point through anchoring beams. The anchoring beams decouple radial motion and circumferential motion of the resonating blocks. The resonating blocks include first resonating blocks, second resonating blocks, third resonating blocks, and fourth resonating blocks. In a vibration mode, the transducer drives the first and second resonating blocks to vibrate along a first axis and a second axis respectively, so the third and fourth resonating blocks are driven to vibrate along the fourth axis and the third axis respectively. In a detection mode, the transducer detects vibration of the third resonating blocks along the third axis and the vibration of the fourth resonating blocks along the fourth axis.

8 Claims, 5 Drawing Sheets

MEMS GYROSCOPE

TECHNICAL FIELD

The present disclosure relates to a technical field of gyroscopes, and in particular to a MEMS gyroscope

BACKGROUND

Micro-electro-mechanical system (MEMS) gyroscope is a type of miniature angular velocity sensor made by applying micromachining technology and microelectronic technology. Typical structures of the MEMS gyroscopes comprise a tuning fork type, a ring type, a nested ring type, a disc type, a hemispherical type, etc. A ring MEMS gyroscope has highly symmetrical drive and sense modes, and it calculates value of the angular velocity subjected to the ring MEMS gyroscope in the sense mode. However, the ring MEMS gyroscope in the prior art is still limited by drive/detection capacitance and effective vibration mass, so the ring MEMS gyroscopes still have deficiencies in drive/detection sensitivity.

Therefore, it is necessary to provide a MEMS gyroscope to solve the above problems.

SUMMARY

Purpose of the present disclosure is to provide a micro-electro-mechanical system (MEMS) gyroscope, which not only improves drive/detection sensitivity, but also effectively reduces air damping, mechanical noise, and effectively reduce frequency difference and quadrature error caused by process error.

The present disclosure provides a MEMS gyroscope. The MEMS gyroscope comprises an anchor point, a resonator, and a transducer electrically coupled to the resonator. The resonator comprises eight resonating blocks and a coupling beam. The eight resonating blocks are distributed in a ring shape and are arranged at equal intervals along a circumference of the anchor point. Each two adjacent resonating blocks are connected with each other through the coupling beam. The resonating blocks are connected with the anchor point through anchoring beams. The coupling beam comprises a first coupling beam and second coupling beams arranged at intervals along a radial direction of the anchor point. The first coupling beam and the second coupling beams are elastically deformable. The anchoring beams oscillate in working modes, so the resonating blocks perform radial motion and circumferential motion for decoupling. The eight resonating blocks comprise a pair of first resonating blocks spaced apart along a first axis, a pair of second resonating blocks spaced apart along a second axis, a pair of third resonating blocks spaced apart along a third axis, and a pair of fourth resonating blocks spaced apart along a fourth axis. The first axis is perpendicular to the second axis. The third axis is perpendicular to the fourth axis. The first axis and the third axis form an included angle of 45 degrees or 135 degrees.

The working modes comprises a vibration mode and a detection mode. In the vibration mode, the transducer drives the pair of first resonating blocks to vibrate along the first axis and drives the pair of second resonating blocks to vibrate along the second axis, so the pair of third resonating blocks is driven to vibrate along the fourth axis and the pair of fourth resonating blocks is driven to vibrate along the third axis. In the detection mode, the transducer detects vibration of the third resonating blocks along the third axis and the vibration of the pair of fourth resonating blocks along the fourth axis.

Optionally, the transducer comprises eight outer electrodes. Each of the outer electrodes is arranged on one side of a corresponding resonating block away from the anchor point. A potential of the outer electrodes arranged corresponding to the first resonating blocks is opposite to a potential of the outer electrodes arranged corresponding to the second resonating blocks. A potential of the outer electrodes arranged corresponding to the third resonating blocks is opposite to a potential of the outer electrodes arranged corresponding to the fourth resonating blocks.

Optionally, the transducer comprises 8N inner electrodes. Each of the resonating blocks defines N inserting holes along an axial direction of the anchor point. The inserting holes are through holes. The inner electrodes are one-to-one inserted into the inserting holes. A potential of the inner electrodes arranged corresponding to the first resonating blocks is opposite to a potential of the inner electrodes arranged corresponding to the second resonating blocks. A potential of the inner electrodes arranged corresponding to the third resonating blocks is opposite to a potential of the inner electrodes arranged corresponding to the fourth resonating blocks. N is a positive integer. When N is greater than 1, the N inserting holes on each of the resonating blocks are arranged at intervals along the radial direction of the anchor point.

Optionally, the inner electrodes comprise first electrodes and second electrodes. The first electrodes and the second electrodes are arranged at intervals along the radial direction of the anchor point. A potential of the first inner electrodes is opposite to a potential of the second inner electrodes.

Optionally, the transducer comprises eight outer electrodes and 8N inner electrodes. Each of the outer electrodes is arranged on one side of a corresponding resonating block away from the anchor point. Each of the resonating blocks defines N inserting holes along an axial direction of the anchor point. The inserting holes are through holes. The inner electrodes are one-to-one inserted into the inserting holes. A potential of the outer electrodes arranged corresponding to a corresponding resonating block of the resonating blocks is opposite to a potential of the inner electrodes arranged corresponding to the corresponding resonating block of the resonating blocks. A potential of the outer electrodes arranged corresponding to the first resonating blocks is opposite to a potential of the outer electrodes arranged corresponding to the second resonating blocks. A potential of the outer electrodes arranged corresponding to the third resonating blocks is opposite to a potential of the outer electrodes arranged corresponding to the fourth resonating blocks. N is a positive integer. When N is greater than 1, the N inserting holes on each of the resonating blocks are arranged at intervals along the radial direction of the anchor point.

Optionally, the anchor point is in a shape of a regular octagon. Each of the resonating blocks is connected to each side of the anchor point through a corresponding anchoring beam.

Optionally, the first coupling beam is connected to a first end of each of the resonating blocks away from the anchor point. Each of the second coupling beams is connected to a second end of each of the resonating blocks close to the anchor point.

Optionally, the first coupling beam and the second coupling beams have corner angles. Openings of the corner angles toward the anchor point, and the first coupling beam and the second coupling beams are symmetrical with respect to an angle bisector of each of the corner angles.

Compared with the prior art, embodiments of the present disclosure have following characteristics.

Compared with a conventional tuning fork gyroscope with four resonating blocks, the MEMS gyroscope of the present disclosure adopts a symmetrical design, and an overall motion mode presents a disc-like continuous fluctuation state, which effectively reduces the frequency difference and quadrature error caused by process errors.

Compared with a conventional disc gyroscope (small gaps between rings of the conventional disc gyroscope make the air damping large), the MEMS gyroscope of the present disclosure adopts large-mass resonating blocks to move, which effectively reduce the air damping, thereby improving a quality factor (Q) value and increasing sensitivity. In addition, large motion mass effectively reduces the mechanical noise of MEMS gyroscope.

Compared with the conventional disc gyroscope (a displacement of an outer ring of the conventional disc gyroscope is greatest, displacements of inner rings is gradually reduced, and the electrodes are arranged on the outer side), the resonating blocks of the present disclosure are in an overall translation state. The electrodes of the transducer are arranged inside and outside the resonating blocks, which increases an arrangement area of the transducer, reduces a driving voltage, and improves the sensitivity.

Compared with a conventional resonating block design with decoupling structures (the Coriolis gain of the conventional resonator block design with decoupling structures is not greater than 0.5), in the vibration/detection mode of the present application, the resonator blocks for detecting/vibrating translate to realize decoupling of the resonating blocks in a vibration/detection direction. Each of the resonating blocks participates in the Coriolis motion, which greatly improve the Coriolis gain (the Coriolis gain in the present disclosure is greater than 0.7), thereby improving the sensitivity.

DETAILED DESCRIPTION

The present disclosure will be further described below with reference to the accompanying drawings and embodiments.

It should be noted that all directional indications (such as "up", "down", "left", "right", "front", "back", etc.) in the embodiments of the present disclosure are only used to explain relative positional relationship, movement situations, etc. of various components under a certain configuration (as shown in the accompanying drawings). If the specific posture changes, the directional indication changes accordingly.

It should also be noted that when an element is referred to as being "fixed to" or "disposed on" another element, it can be directly on the other element or an intermediary element may be provided. When an element is referred to as being "connected" to another element, it can be directly connected to the other element or an intermediary element may be provided.

In addition, descriptions involving "first", "second", etc. in the present disclosure are only for descriptive purposes, and should not be understood as indicating or implying relative importance or implying the number of indicated technical features. Thus, a feature delimited with "first" or "second" may expressly or implicitly include at least one of that feature. In addition, technical solutions between various embodiments can be combined with each other, but must be based on the realization by those of ordinary skill in the art. When the combination of the technical solutions is contradictory or cannot be realized, it should be considered that the combination of such technical solutions is moot and is not within the protection scope of the present disclosure.

The present disclosure discloses a MEMS gyroscope, which is installed in an electronic product to detect an angular velocity of the electronic product.

Embodiment 1

Figure 1:
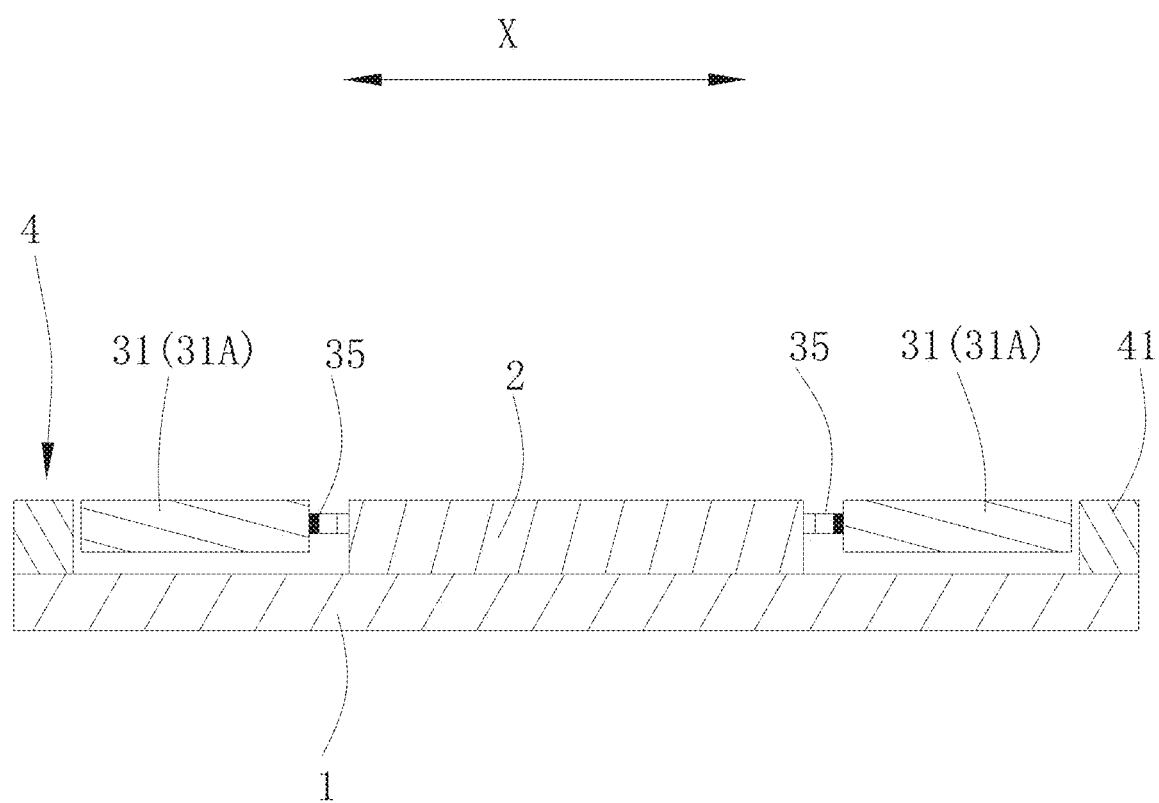
FIG. 1 is a cross-sectional schematic diagram of a MEMS gyroscope according to a first embodiment of the present disclosure.
Figure 2:
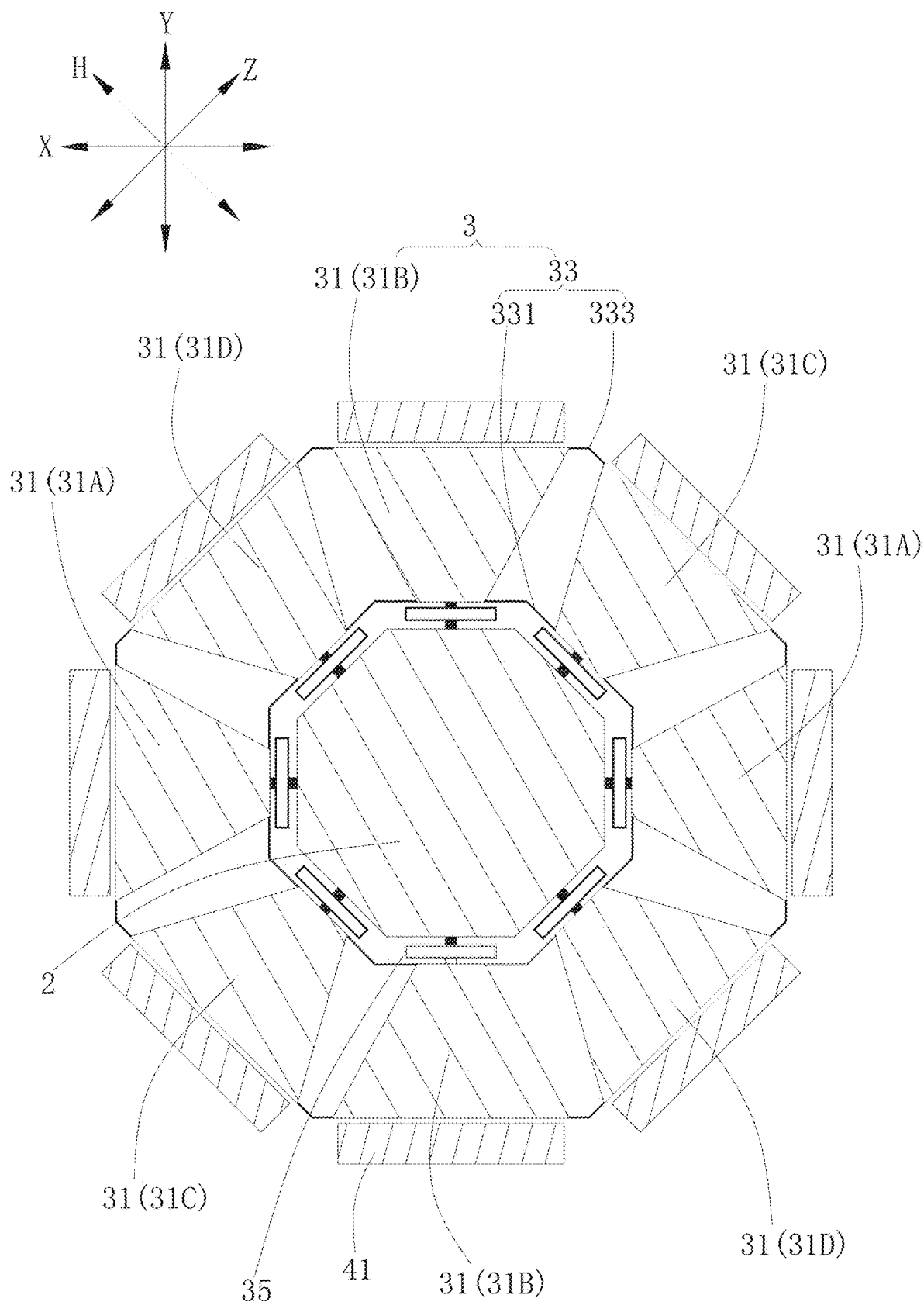
FIG. 2 is a schematic diagram of the MEMS gyroscope shown in FIG. 1.
Figure 3:
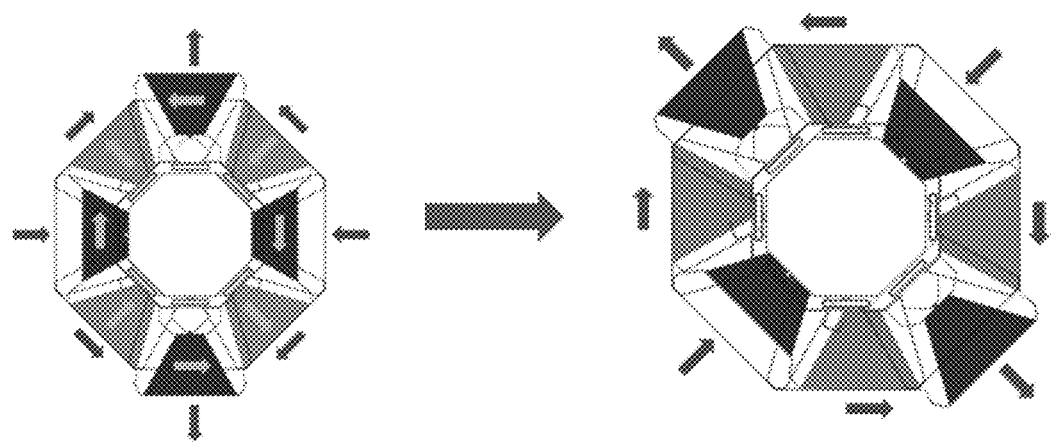
FIG. 3 is a schematic diagram of the MEMS gyroscope shown in FIG. 1 showing principle of angular velocity detection.

As shown in FIGS. 1-3, the MEMS gyroscope comprises a substrate 1, an anchor point 2, a resonator 3, and a transducer 4. The anchor point 2 and the transducer 4 are fixed to the substrate 1, and the resonator 3 is suspended on the substrate 1.

The resonator 3 adopts a fully symmetrical design. The resonator 3 comprises eight resonating blocks 31 and a coupling beam 33. The eight resonating blocks 31 are distributed in a ring shape and are arranged at equal intervals along a circumference of the anchor point 2. Each two adjacent resonating blocks 31 are connected with each other through the coupling beam 33. The eight resonating blocks 31 comprise a pair of first resonating blocks 31A spaced apart along a first axis X, a pair of second resonating blocks 31B spaced apart along a second axis Y, a pair of third resonating blocks 31C spaced apart along a third axis Z, and a pair of fourth resonating blocks 31D spaced apart along a fourth axis H. The first axis X is perpendicular to the second axis Y. The third axis Z is perpendicular to the fourth axis H. The first axis X and the third axis Z form an included angle of 45 degrees or 135 degrees;

The resonating blocks 31 are connected with the anchor point 2 through anchoring beams 35. The anchoring beams 35 oscillate in working modes, so the resonating blocks 31 perform radial motion and circumferential motion for decoupling.

As shown in FIG. 2, the anchor point 2 is in a shape of a regular octagon. Each of the resonating blocks 31 is connected to each side of the anchor point 2 through a corresponding anchoring beam 35. It is understood that the anchor point 2 is not limited to be in the shape of the regular octagon. For example, in other embodiments, the anchor point 2 may be in a shape of a circle.

The coupling beam 33 comprises a first coupling beam 331 and second coupling beams 333 arranged at intervals along a radial direction of the anchor point 2. The first coupling beam 331 and the second coupling beams 333 are elastically deformable.

As shown in FIG. 2, the first coupling beam 331 is connected to a first end of each of the resonating blocks 31 away from the anchor point 2. Each of the second coupling beams 332 is connected to a second end of each of the resonating blocks 31 close to the anchor point 2.

In the embodiment, the first coupling beam 331 and the second coupling beams 332 have corner angles. Openings of the corner angles toward the anchor point 2, and the first coupling beam 331 and the second coupling beams 332 are symmetrical with respect to an angle bisector of each of the corner angles.

The transducer 4 is electrically coupled to the resonator 3. The working modes comprises a vibration mode and a detection mode. In the vibration mode, the transducer 4 drives the pair of first resonating blocks 31A to vibrate along the first axis X and drives the pair of second resonating blocks 31B to vibrate along the second axis vibrates, so the pair of third resonating blocks 31C is driven to vibrate along the fourth axis H and the pair of fourth resonating blocks 31D is driven to vibrate along the third axis Z. In the detection mode, the transducer 4 detects vibration of the third resonating blocks 31C along the third axis Z and the vibration of the pair of fourth resonating blocks 31D along the fourth axis H. Accordingly, when the pair of third resonating blocks 31C vibrates along the third axis Z and the pair of fourth resonating blocks 31D vibrates along the fourth axis H, driving the pair of first resonating blocks 31A to vibrate along the second axis Y and driving the pair the second resonating blocks 31B to vibrate along the first axis X.

As shown in FIG. 3, when the MEMS gyroscope drives the pair of first resonating blocks 31A to vibrate along the first axis X and drives the pair of second resonating blocks 31B to vibrate along the second axis Y through an external driving force, the pair of third resonating blocks 31C vibrates along the fourth axis H and the pair of fourth resonating blocks 31D vibrates along the third axis Z. According to the Coriolis principle, when the external Z-axis angular velocity is applied, the first resonating blocks 31A generate the Coriolis force along the second axis Y, the second resonating blocks 31B generate the Coriolis force along the first axis X, the third resonating blocks 31C generate the Coriolis force along the third axis Z, and the fourth resonating blocks 31D generate the Coriolis force along the fourth axis H, By detecting a vibration displacement of the pair of third resonating blocks 31C along the third axis Z and a vibration displacement of the pair of fourth resonating blocks 31D along the fourth axis H, a magnitude of the angular velocity is obtained.

It should be noted that the anchoring beams 35 oscillate in working modes, so the resonating blocks 31 perform radial motion and circumferential motion for decoupling means that:

In the vibration mode, when the pair of first resonating blocks 31A vibrates along the first axis X and the pair of second resonating blocks 31B vibrates along the second axis Y, the anchoring beams 35 connected to the third resonating blocks 31C and the anchoring beams 35 connected to the fourth resonating blocks 31D oscillate, so that connecting portions between the anchoring beams 35 and the third resonating blocks 31C and the connecting portions between the anchoring beam 35 and the fourth resonating blocks 31D translate. Thus, the pair of third resonating blocks 31C vibrates along the fourth axis H and the pair of fourth resonating blocks 31D vibrates along the third axis Z (that is, the third resonating blocks 31C and fourth resonating blocks 31D vibrate in the circumferential direction of the anchor point 2) and there is no displacement in the radial direction of the anchor point 2. Therefore, there is no detection output;

Similarly, in the detection mode, when the pair of third resonating blocks 3C vibrates along the third axis Z and the pair of fourth resonating blocks 31D vibrates along the fourth axis H, the anchoring beams 35 connected to the first resonating blocks 31A and the anchoring beams 35 connected to the second resonating blocks 31B oscillate, so that connecting portions between the anchoring beams 35 and the first resonating blocks 31A and the connecting portions between the anchoring beam 35 and the second resonating blocks 31B translate. Thus, the pair of first resonating blocks 31A vibrates along the second axis Y and the pair of second resonating blocks 31B vibrates along the first axis X (that is, the first resonating blocks 31A and the second resonating blocks 31B vibrate in the circumferential direction of the anchor point 2) and there is no displacement in the axial direction of the anchor point 2. Therefore, there is no driving output.

It should also be noted that, taking the vibration mode of the MEMS gyroscope as an example, when the configuration of the coupling beam 33 makes the first resonating blocks 31A/the second resonating blocks 31B to move away from the anchor point 2 in one direction, while making the second resonating blocks 31B/the first resonating blocks 31A to move close to the anchor point 2, the first resonating blocks 31A and the second resonating blocks 31B vibrate to generate a resultant force driving the third resonating blocks 31C to vibrate along the fourth axis H.

In the embodiment, the transducer 4 comprises eight outer electrodes 41. Each of the outer electrodes 41 is arranged on one side of a corresponding resonating block 31 away from the anchor point 2. A potential of the outer electrodes 41 arranged corresponding to the first resonating blocks 31A is opposite to a potential of the outer electrodes 41 arranged corresponding to the second resonating blocks 31B. A potential of the outer electrodes 41 arranged corresponding to the third resonating blocks 31C is opposite to a potential of the outer electrodes 41 arranged corresponding to the fourth resonating blocks 31D.

Embodiment 2

Figure 4:
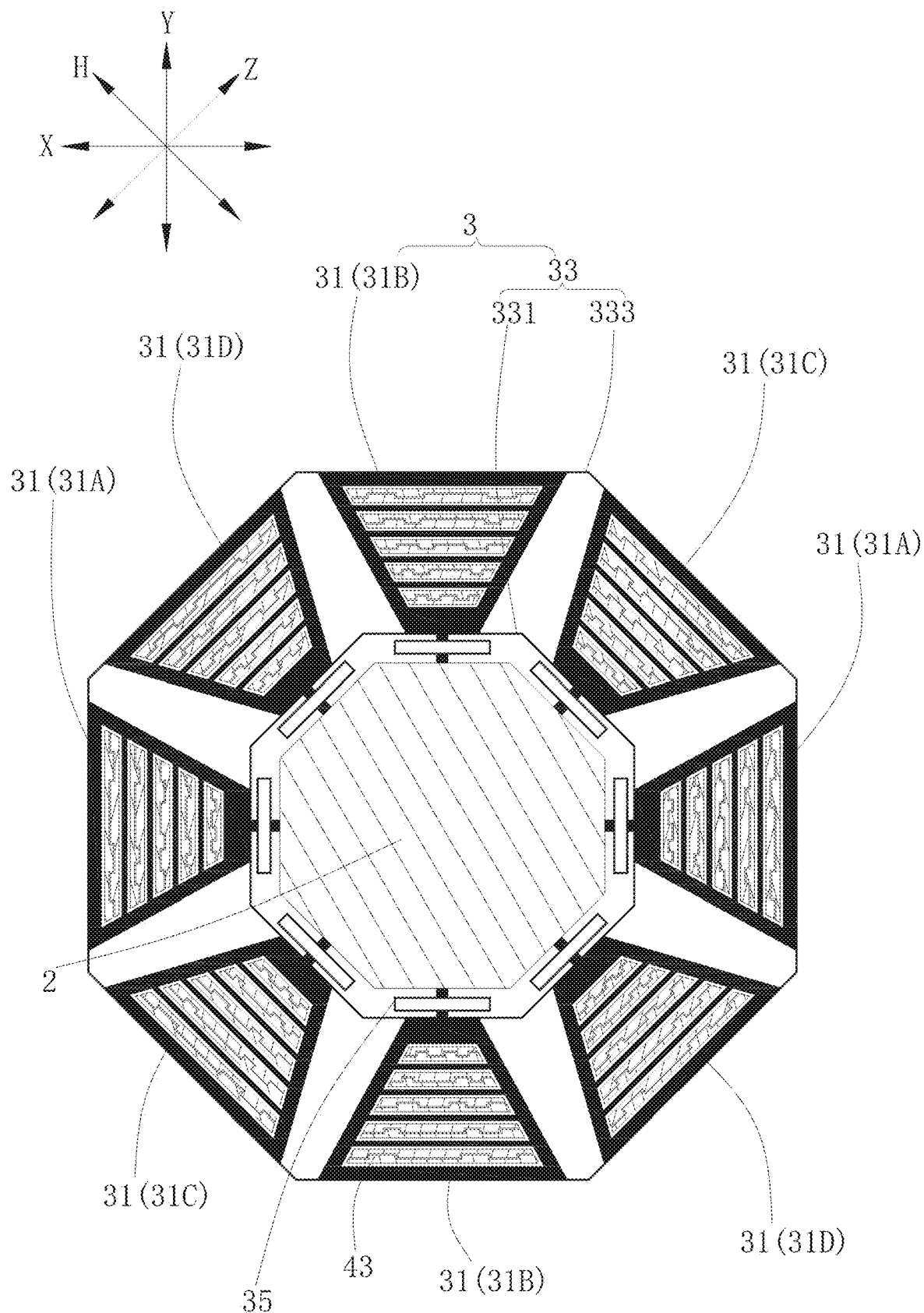
FIG. 4 is a schematic diagram of the MEMS gyroscope according to a second embodiment of the present disclosure.
Figure 5:
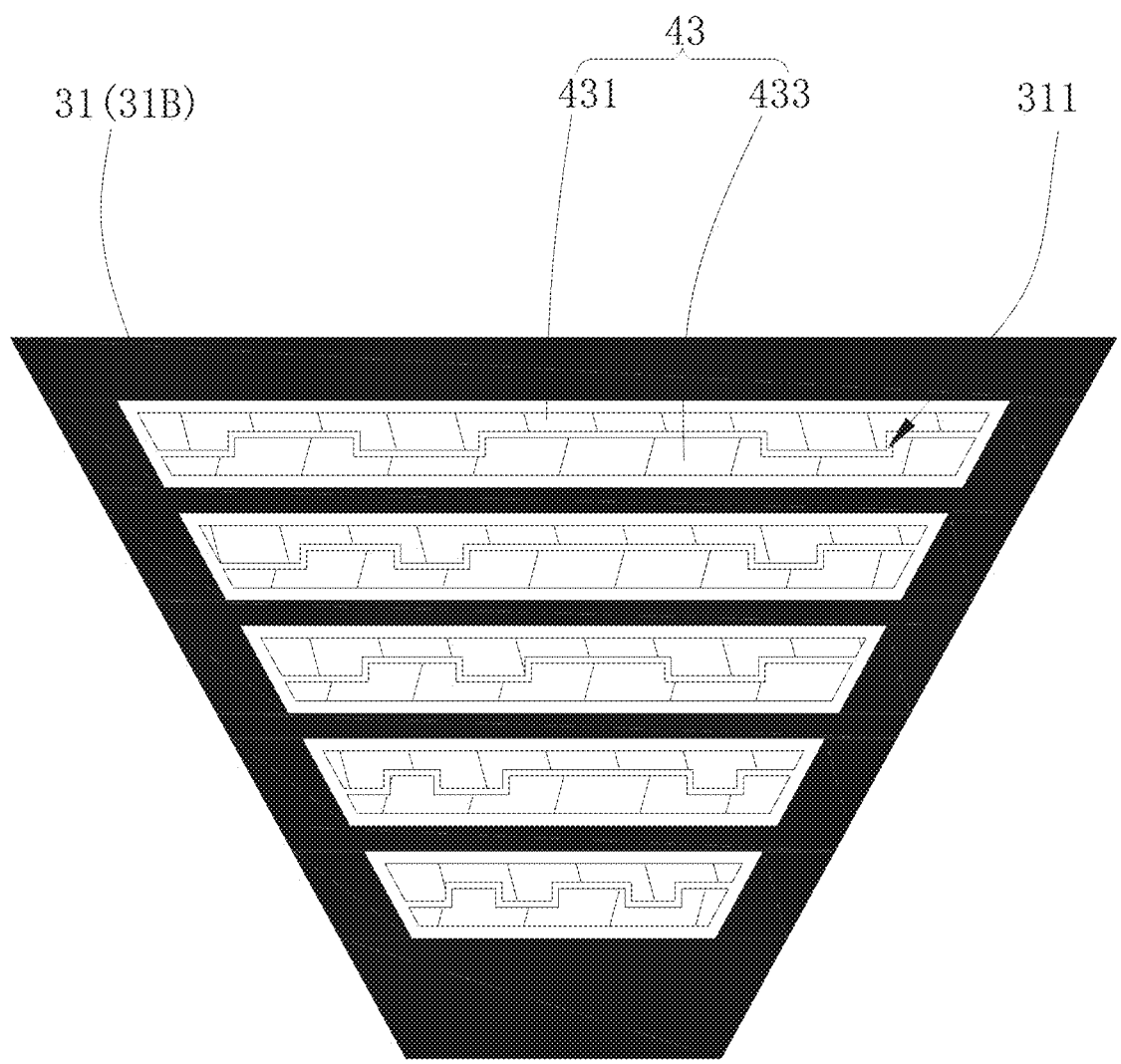
FIG. 5 is a schematic diagram of portions of the MEMS gyroscope shown in FIG. 4.

As shown in FIGS. 4 and 5, differences between the second embodiment and the first embodiment are:

The transducer 4 comprises 8N inner electrodes 43. Each of the resonating blocks 31 defines N inserting holes 311 along an axial direction of the anchor point 2. The inserting holes 311 are through holes. The inner electrodes 43 are one-to-one inserted into the inserting holes 311. A potential of the inner electrodes 43 arranged corresponding to the first resonating blocks 31A is opposite to a potential of the inner electrodes 43 arranged corresponding to the second resonating blocks 31B. A potential of the inner electrodes 43 arranged corresponding to the third resonating blocks 31C is opposite to a potential of the inner electrodes 43 arranged corresponding to the fourth resonating blocks 31D. N is a positive integer. When N is greater than 1, the N inserting holes 311 on each of the resonating blocks 31 are arranged at intervals along the radial direction of the anchor point.

In the embodiment, the inner electrodes 43 comprise first electrodes 431 and second electrodes 433. The first electrodes 431 and the second electrodes 433 are arranged at intervals along the radial direction of the anchor point 2. A potential of the first inner electrodes 431 is opposite to a potential of the second inner electrodes 433.

It should be noted that in other embodiments, the transducer 4 may comprise the eight outer electrodes as described in the first embodiment and the 8N inner electrodes as described in the second embodiment. Each of the outer electrodes 41 and each of the inner electrodes 43 corresponding to a same resonating block 31 have opposite potentials.

The above are only embodiments of the present disclosure. It should be pointed out that for those of ordinary skill in the art, improvements can be made without departing from the inventive concept of the present disclosure, which should all fall within the protection scope of the present disclosure.

What is claimed is:

1. A micro-electro-mechanical system (MEMS) gyroscope, comprising:
   an anchor point;
   a resonator; and
   a transducer electrically coupled to the resonator;
   wherein the resonator comprises eight resonating blocks and a coupling beam; the eight resonating blocks are distributed in a ring shape and are arranged at equal intervals along a circumference of the anchor point; each two adjacent resonating blocks are connected with each other through the coupling beam; the resonating blocks are connected with the anchor point through anchoring beams; wherein the coupling beam comprises a first coupling beam and second coupling beams arranged at intervals along a radial direction of the anchor point; the first coupling beam and the second coupling beams are elastically deformable;
   wherein the anchoring beams oscillate in working modes, so the resonating blocks perform radial motion and circumferential motion for decoupling;
   wherein the eight resonating blocks comprise a pair of first resonating blocks spaced apart along a first axis, a pair of second resonating blocks spaced apart along a second axis, a pair of third resonating blocks spaced apart along a third axis, and a pair of fourth resonating blocks spaced apart along a fourth axis; the first axis is perpendicular to the second axis, the third axis is perpendicular to the fourth axis; the first axis and the third axis form an included angle of 45 degrees or 135 degrees;
   wherein the working modes comprises a vibration mode and a detection mode; in the vibration mode, the transducer drives the pair of first resonating blocks to vibrate along the first axis and drives the pair of second resonating blocks to vibrate along the second axis, so the pair of third resonating blocks is driven to vibrate along the fourth axis and the pair of fourth resonating blocks is driven to vibrate along the third axis; in the detection mode, the transducer detects vibration of the pair of third resonating blocks along the third axis and the vibration of the pair of fourth resonating blocks along the fourth axis.

2. The MEMS gyroscope according to claim 1, wherein the transducer comprises eight outer electrodes; each of the outer electrodes is arranged on one side of a corresponding resonating block away from the anchor point; a potential of the outer electrodes arranged corresponding to the first resonating blocks is opposite to a potential of the outer electrodes arranged corresponding to the second resonating blocks; a potential of the outer electrodes arranged corresponding to the third resonating blocks is opposite to a potential of the outer electrodes arranged corresponding to the fourth resonating blocks.

3. The MEMS gyroscope according to claim 1, wherein the transducer comprises 8N inner electrodes, each of the resonating blocks defines N inserting holes along a axial direction of the anchor point; the inserting holes are through holes; the inner electrodes are one-to-one inserted into the inserting holes; a potential of the inner electrodes arranged corresponding to the first resonating blocks is opposite to a potential of the inner electrodes arranged corresponding to the second resonating blocks; a potential of the inner electrodes arranged corresponding to the third resonating blocks is opposite to a potential of the inner electrodes arranged corresponding to the fourth resonating blocks;
   wherein N is a positive integer; when N is greater than 1, the N inserting holes on each of the resonating blocks are arranged at intervals along the radial direction of the anchor point.

4. The MEMS gyroscope according to claim 3, wherein the inner electrodes comprise first electrodes and second electrodes; the first electrodes and the second electrodes are arranged at intervals along the radial direction of the anchor point; a potential of the first inner electrodes is opposite to a potential of the second inner electrodes.

5. The MEMS gyroscope according to claim 1, wherein the transducer comprises eight outer electrodes and 8N inner electrodes; each of the outer electrodes is arranged on one side of a corresponding resonating block away from the anchor point; each of the resonating blocks defines N inserting holes along a axial direction of the anchor point; the inserting holes are through holes; the inner electrodes are one-to-one inserted into the inserting holes; a potential of the outer electrodes arranged corresponding to a corresponding resonating block of the resonating blocks is opposite to a potential of the inner electrodes arranged corresponding to the corresponding resonating block of the resonating blocks; a potential of the outer electrodes arranged corresponding to the first resonating blocks is opposite to a potential of the outer electrodes arranged corresponding to the second resonating blocks; a potential of the outer electrodes arranged corresponding to the third resonating blocks is opposite to a potential of the outer electrodes arranged corresponding to the fourth resonating blocks; N is a positive integer; when N is greater than 1, the N inserting holes on each of the resonating blocks are arranged at intervals along the radial direction of the anchor point.

6. The MEMS gyroscope according to claim 1, wherein the anchor point is in a shape of a regular octagon; and each of the resonating blocks is connected to each side of the anchor point through a corresponding anchoring beam.

7. The MEMS gyroscope according to claim 1, wherein the first coupling beam is connected to a first end of each of the resonating blocks away from the anchor point; each of the second coupling beams is connected to a second end of each of the resonating blocks close to the anchor point.

8. The MEMS gyroscope according to claim 1, wherein the first coupling beam and the second coupling beams have corner angles; openings of the corner angles toward the anchor point, and the first coupling beam and the second coupling beams are symmetrical with respect to an angle bisector of each of the corner angles.

* * * * *